(12) United States Patent
Kawanami

(10) Patent No.: US 9,888,175 B2
(45) Date of Patent: Feb. 6, 2018

(54) IMAGE CAPTURING ACCESSORY, IMAGE CAPTURING APPARATUS, CONTROL METHOD THEREOF AND STORAGE MEDIUM STORING COMMUNICATION CONTROL PROGRAM

(71) Applicant: CANON KABUSHIKI KAISHA, Tokyo (JP)

(72) Inventor: Akihiro Kawanami, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 3 days.

(21) Appl. No.: 14/922,279

(22) Filed: Oct. 26, 2015

(65) Prior Publication Data

US 2016/0127644 A1  May 5, 2016

(30) Foreign Application Priority Data

Oct. 29, 2014 (JP) .................................. 2014-219941

(51) Int. Cl.
*H04N 5/232* (2006.01)
*H04N 5/235* (2006.01)
(Continued)

(52) U.S. Cl.
CPC ......... *H04N 5/23241* (2013.01); *G03B 17/14* (2013.01); *H04N 5/2254* (2013.01);
(Continued)

(58) Field of Classification Search
CPC ........... H04N 5/23241; H04N 5/23209; H04N 5/2353; H04N 5/357; H04N 5/2254; H04N 5/23293; G03B 17/14
See application file for complete search history.

(56) References Cited

U.S. PATENT DOCUMENTS 8,147,148 B2    4/2012  Kawanami
2004/0025108 A1  2/2004  Beverly

FOREIGN PATENT DOCUMENTS

EP    2385646 A1    11/2011
JP    2009258558 A  11/2009
(Continued)

OTHER PUBLICATIONS

Extended Search Report issued in European Appln. No. 15191892.7 dated Apr. 1, 2016.
(Continued)

*Primary Examiner* — Twyler Haskins
*Assistant Examiner* — Angel L Garces-Rivera
(74) *Attorney, Agent, or Firm* — Rossi, Kimms & McDowell LLP

(57) ABSTRACT

The accessory is detachably attachable to an image capturing apparatus. The accessory includes a communicator configured to communicate with the image capturing apparatus in multiple communication modes, and a communication mode setter configured to set one of the multiple communication modes which corresponds to command information received from the image capturing apparatus as a use communication mode used to communicate with the image capturing apparatus. The communication mode setter is configured to set the use communication mode corresponding to the command information in response to reception of the command information and reception of first correspondence information different from the command information and in correspondence with the command information, from the image capturing apparatus.

20 Claims, 6 Drawing Sheets

(51) Int. Cl.
  *H04N 5/357* (2011.01)
  *H04N 5/225* (2006.01)
  *G03B 17/14* (2006.01)
(52) U.S. Cl.
  CPC ....... *H04N 5/2353* (2013.01); *H04N 5/23209* (2013.01); *H04N 5/23293* (2013.01); *H04N 5/357* (2013.01)

(56) References Cited

FOREIGN PATENT DOCUMENTS

| | | | |
|---|---|---|---|
| JP | 2013160897 | A | 8/2013 |
| JP | 2013167895 | A | 8/2013 |
| WO | 2009130849 | A1 | 10/2009 |

OTHER PUBLICATIONS

Office Action issued in European Patent Application No. 15191892.7 dated Sep. 1, 2017.

| COMMAND INFORMATION | ONE'S COMPLEMENT INFORMATION |
|---|---|
| 89hex | 76hex |
| ABhex | 54hex |
| CDhex | 32hex |
| EFhex | 10hex |
| E7hex | 18hex |

IMAGE CAPTURING ACCESSORY, IMAGE CAPTURING APPARATUS, CONTROL METHOD THEREOF AND STORAGE MEDIUM STORING COMMUNICATION CONTROL PROGRAM

BACKGROUND OF THE INVENTION

Field of the Invention

The present invention relates to an accessory used for image capturing and an image capturing apparatus which are capable of communicating with each other, and particularly to an accessory and an image capturing apparatus which are capable of switching a use communication mode.

Description of the Related Art

Japanese Patent Laid-open No. 2013-167895 discloses an interchangeable lens (hereinafter also referred to as "a lens") as an accessory for image capturing which detects a voltage level of a communication terminal shared with an image capturing apparatus (hereinafter referred to as a camera) and the lens when communicating with the camera in synchronization with an exposure timing of the camera. When the voltage level of the communication terminal has not changed for a certain time, the lens determines that following communication is switched to communication in synchronization with the exposure timing.

Furthermore, Japanese Patent Laid-open No. 2009-258558 discloses a camera system that switches a communication mode between a camera and a lens to one of communication modes such as UART and USB when a moving image capturing mode is selected as an image capturing mode of the camera.

However, the lens disclosed in Japanese Patent Laid-open No. 2013-167895 may perform a false determination when the voltage level of the communication terminal shared with the camera and the lens is changed by an external noise. On the other hand, the camera system disclosed in Japanese Patent Laid-open No. 2009-258558 switches the communication mode in response to a single command from the camera, and thus reception of an external noise simultaneously with reception of the command prevents the lens from receiving the command correctly. In this case, the camera switches the communication mode whereas the lens does not switch the communication mode, thereby preventing correct communication between the camera and the lens.

SUMMARY OF THE INVENTION

The present invention provides an accessory and an image capturing apparatus which are capable of achieving robustness to influence of an external noise when switching a use communication mode used to communicate between the accessory and the image capturing apparatus.

The present invention provides as an aspect thereof an accessory detachably attachable to an image capturing apparatus. The accessory includes a communicator configured to communicate with the image capturing apparatus in multiple communication modes, and a communication mode setter configured to set one of the multiple communication modes which corresponds to command information received from the image capturing apparatus as a use communication mode used to communicate with the image capturing apparatus. The communication mode setter is configured to set the use communication mode corresponding to the command information in response to reception of the command information and reception of first correspondence information different from the command information and in correspondence with the command information, from the image capturing apparatus.

The present invention provides as another aspect thereof an image capturing apparatus to which an accessory is detachably attachable. The image capturing apparatus includes a communicator configured to communicate with the accessory in multiple communication modes, and a communication mode setter configured to select one of the multiple communication modes to set the selected communication mode as a use communication mode used to communicate with the accessory. The communication mode setter is configured to transmit command information for causing the accessory to set the selected communication mode as the use communication mode to the accessory and configured to set the selected communication mode as the use communication mode in response to reception of second correspondence information different from the command information and in correspondence with the command information from the accessory.

The present invention provides as yet another aspect thereof a method of controlling an accessory detachably attachable to an image capturing apparatus. The accessory is configured to communicate with the image capturing apparatus in multiple communication modes and to set one of the multiple communication modes which corresponds to command information received from the image capturing apparatus as a use communication mode used to communicate with the image capturing apparatus. The method includes a step of receiving the command information from the image capturing apparatus, a step of receiving first correspondence information different from the command information and in correspondence with the command information from the image capturing apparatus, and a step of setting the use communication mode corresponding to the command information in response to reception of the command information and reception of the first correspondence information.

The present invention provides as still another aspect thereof a non-transitory computer-readable storage medium storing a communication control program as a computer program for controlling an accessory detachably attachable to an image capturing apparatus. The program causes a computer included in the accessory to execute a process according to the above method of controlling the accessory.

The present invention provides as further another aspect thereof a method of controlling an image capturing apparatus to which an accessory is detachably attachable. The image capturing apparatus is configured to communicate with the accessory in multiple communication modes and to select one of the multiple communication modes to set the selected communication mode as a use communication mode used to communicate with the accessory. The method includes a step of transmitting command information for causing the accessory to set the selected communication mode as the use communication mode to the accessory, a step of receiving second correspondence information different from the command information and in correspondence with the command information from the accessory, and a step of setting the selected communication mode as the use communication mode in response to reception of the second correspondence information.

The present invention provides as yet further another aspect thereof a non-transitory computer-readable storage medium storing a communication control program as a computer program for controlling an image capturing apparatus to which an accessory is detachably attachable. The program causes a computer included in the image capturing apparatus to execute a process according to the above method of controlling the image capturing apparatus.

Further features and aspects of the present invention will become apparent from the following description of exemplary embodiments with reference to the attached drawings.

DESCRIPTION OF THE EMBODIMENTS

Exemplary embodiments of the present invention will be described below with reference to the accompanied drawings.

Embodiment 1

Figure 1:
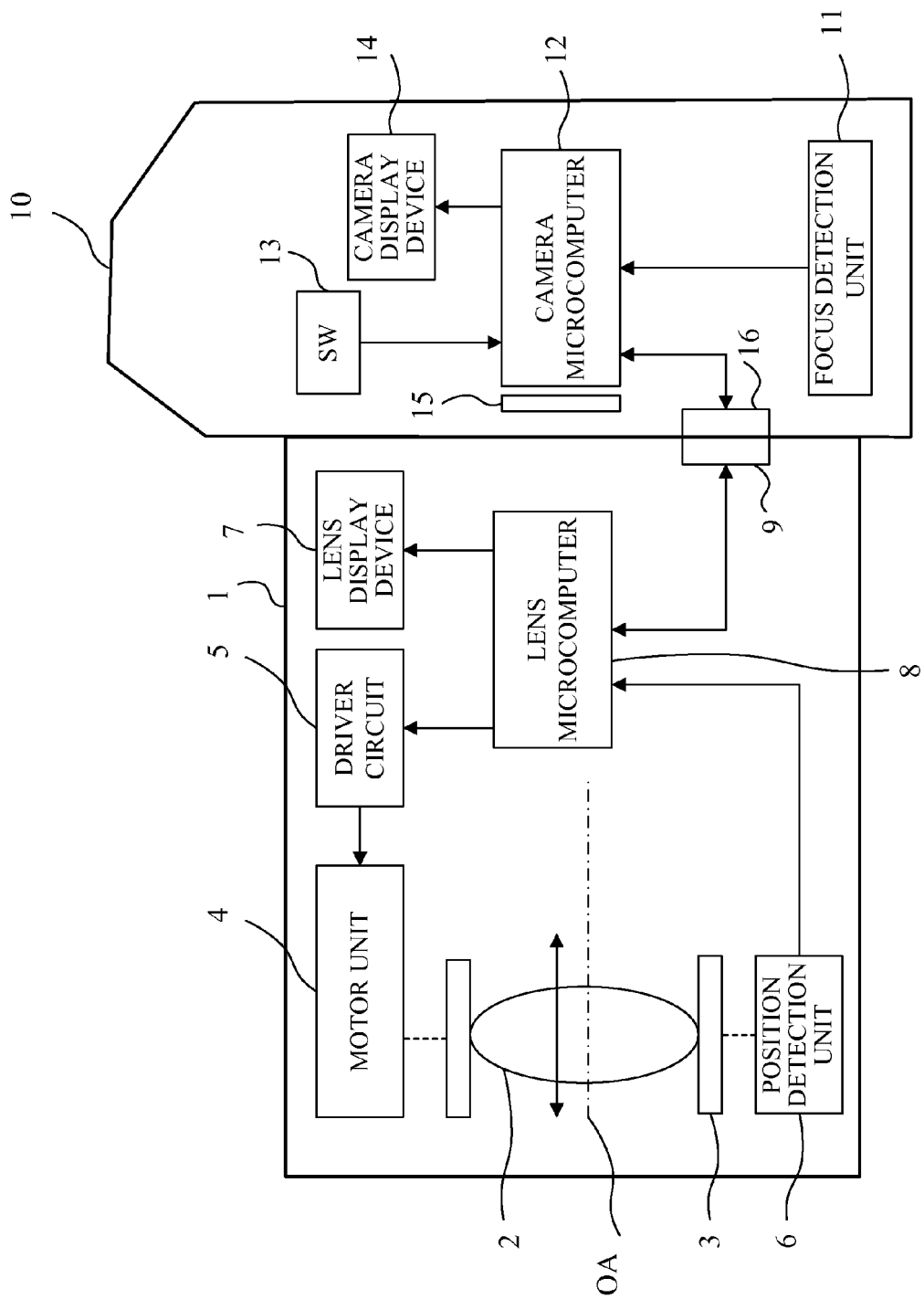
FIG. 1 is a block diagram of configurations of a camera and an interchangeable lens in Embodiment 1 of the present invention.

FIG. 1 illustrates a configuration of an image capturing system including an image capturing apparatus (hereinafter referred to as "a camera body") 10 that is a first embodiment (Embodiment 1) of the present invention and an interchangeable lens (lens apparatus) as an image capturing accessory that is also Embodiment 1. The interchangeable lens is detachably attached to the camera body 10.

The interchangeable lens 1 is provided with an image capturing optical system including a focus lens 2, a focus drive unit 3, a motor unit 4, a driver circuit 5, a position detection unit 6, a lens display device 7, a lens microcomputer 8 and a lens contact unit 9.

The focus drive unit 3 receives drive power from the motor unit 4 to move the focus lens 2 in an optical axis direction as a direction in which an optical axis OA extends so as to focus the image capturing optical system on an object (not illustrated). The motor unit 4 includes a motor, such as a stepping motor, a vibration-type motor or a voice coil motor, which is driven by voltage supplied from the driver circuit 5. The focus drive unit 3 converts the drive power (rotational force) from the motor unit 4 into drive power in the optical axis direction. The driver circuit 5 applies a drive signal to the motor unit 4 in response to a control signal from the lens microcomputer 8.

The position detection unit 6 detects a position of the focus lens 2 driven by the focus drive unit 3 to output a detection signal to the lens microcomputer 8. The lens display device 7 is constituted by, for example, an LCD or an organic EL element and displays information on a state of the interchangeable lens 1 (such as a focal length and an aperture value), information on various settings and information on various errors.

The lens microcomputer 8 serves as a lens controller that controls operations of the above components included in the interchangeable lens 1 and as a lens communicator that performs communication with the camera body 10 through the lens contact unit 9. The lens microcomputer 8 further serves as a lens setting unit that selects and sets a communication mode used in the communication (hereinafter referred to as "a use communication mode"). The lens microcomputer 8 as the lens setting unit can set (select) multiple communication modes such as a random timing communication mode and a V synchronization communication mode which are described later. The lens microcomputer 8 as the lens controller controls drive of the motor unit 4 and an aperture stop (not illustrated) included in the image capturing optical system in response to focus command information and aperture stop command information acquired from the camera body 10 through the communication.

The lens contact unit 9 is provided in a lens mount for mechanically connecting the interchangeable lens 1 to the camera body 10. The lens contact unit 9 includes multiple lens communication contacts enabling the communication between the interchangeable lens 1 and the camera body 10 and a lens power contact enabling power supply from the camera body 10 to the interchangeable lens 1.

The camera body 10 includes a focus detection unit 11, a camera microcomputer 12, an image capturing trigger switch 13, a camera display device 14, an image sensor 15 and a camera contact unit 16.

The image sensor 15 photoelectrically converts (performs image capturing of) an object image formed by the image capturing optical system of the interchangeable lens 1 to produce an image signal. The focus detection unit 11 detects a focus state of the image capturing optical system by a phase difference detection method or a contrast detection method using the image signal from the image sensor 15.

The camera contact unit 16 is provided in a camera mount for mechanically connecting the camera body 10 to the interchangeable lens 1. The camera contact unit 16 includes multiple camera communication contacts that contact the lens communication contacts of the lens contact unit 9 to enable the communication between the camera body 10 and the interchangeable lens 1. The camera contact unit 16 further includes a camera power contact that contacts the lens power contact of the lens contact unit 9 to enable the power supply from the camera body 10 to the interchangeable lens 1.

The camera microcomputer 12 serves as a camera controller that controls the above components of the camera body 10 and as a camera communicator that communicates with the interchangeable lens 1 through the camera contact unit 16. The camera microcomputer 12 further serves as a camera setting unit that selects and sets the use communication mode. The camera microcomputer 12 as the camera setting unit can set (select) the random timing communication mode and the V synchronization communication mode.

The camera microcomputer 12 as the camera controller calculates a movement amount and movement direction of the focus lens 2 on a basis of the focus state detected by the focus detection unit 11. Then, the camera microcomputer 12 transmits, to the lens microcomputer 8, the focus command information including information on these movement amount and direction to cause the lens microcomputer 8 to perform autofocus (AF). The camera microcomputer 12 performs photometry using the image signal from the image sensor and calculates the aperture value on a basis of information on a result of the photometry. The camera microcomputer 12 transmits, to the lens microcomputer 8, the aperture stop command information including information on the aperture value to cause the lens microcomputer 8 to control the aperture stop.

The image capturing trigger switch 13 is operated by a user to start image capturing preparation operations including the AF and the photometry and to instruct image capturing of a record image. A signal from the image capturing trigger switch 13 is output to the camera microcomputer 12.

The camera display device 14 is constituted by, for example, an LCD or an organic EL element and displays the followings: an image produced by image capturing; information on various settings in the camera body 10 such as an image capturing mode (a still image capturing mode or a moving image capturing mode), a shutter speed and the aperture value; and information on various errors.

Figure 2:
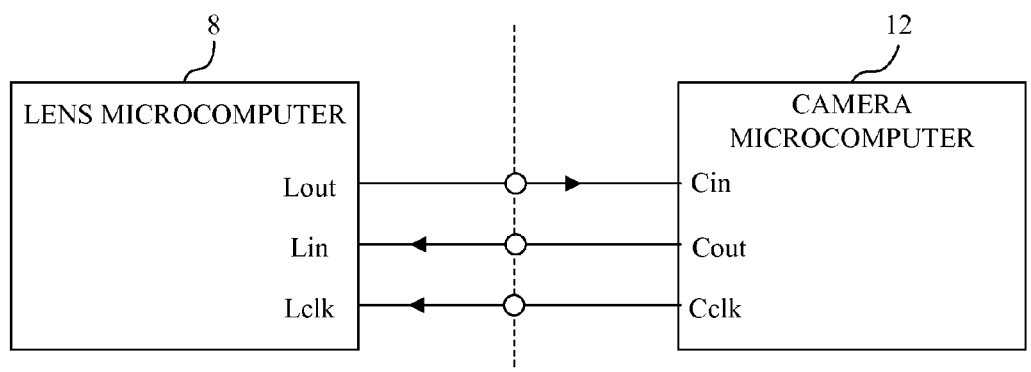
FIG. 2 illustrates a communication circuit between the camera (a camera microcomputer) and the interchangeable lens (a lens microcomputer) in Embodiment 1.

Next, description will be made of a communication circuit constituted between the interchangeable lens 1 (lens microcomputer 8) and the camera body 10 (camera microcomputer 12) and of a communication process performed therebetween. FIG. 2 illustrates the communication circuit constituted between the lens microcomputer 8 and the camera microcomputer 12. In this embodiment, the lens microcomputer 8 and the camera microcomputer 12 communicate various information (hereinafter, also referred to as "communication signals") using their serial communication function. As illustrated in FIG. 2, the lens microcomputer 8 includes a lens input terminal Lin, a lens output terminal Lout and a lens synchronization clock input terminal Lclk. The lens input terminal Lin receives a camera communication signal transmitted from the camera microcomputer 12. The lens output terminal Lout transmits a lens communication signal to be received by the camera microcomputer 12. The lens synchronization clock input terminal Lclk receives clock signals (described later) transmitted from the camera microcomputer 12.

The camera microcomputer 12 includes a camera input terminal Cin, a camera output terminal Cout and a camera synchronization clock output terminal Cclk. The camera input terminal Cin receives the lens communication signal transmitted from the lens microcomputer 8. The camera output terminal Cout transmits the camera communication signal to be received by the lens microcomputer 8. The camera synchronization clock output terminal Cclk transmits the clock signals to the lens microcomputer 8. The camera microcomputer 12 outputs the clock signals of a predetermined period through the camera synchronization clock output terminal Cclk. The lens microcomputer 8 receives these clock signals through the lens synchronization clock input terminal Lclk. The camera microcomputer 12 and the lens microcomputer 8 each perform the communication in synchronization with the clock signals. This communication mode is generally called as a clock-synchronized serial communication. In this embodiment, the camera microcomputer 12 outputs clock signals of eight periods, and the camera microcomputer 12 and the lens microcomputer 8 communicate information of one bite (8 bits) in one communication.

Figure 3:
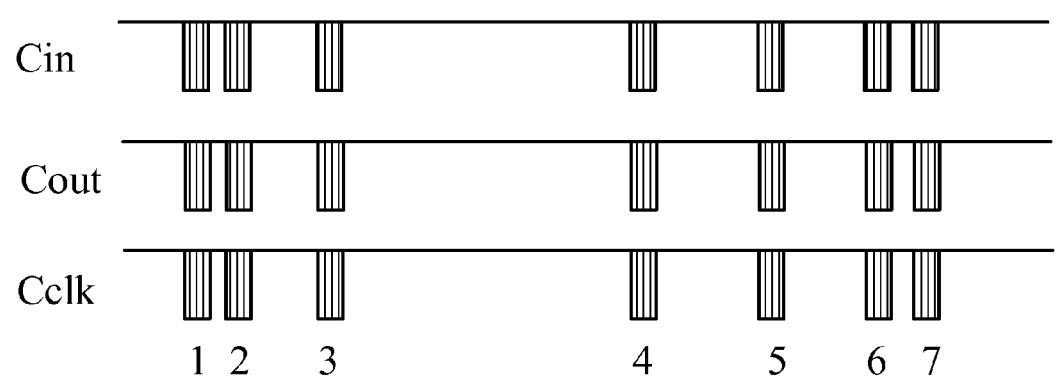
FIG. 3 illustrates a first communication mode in Embodiment 1.
Figure 4:
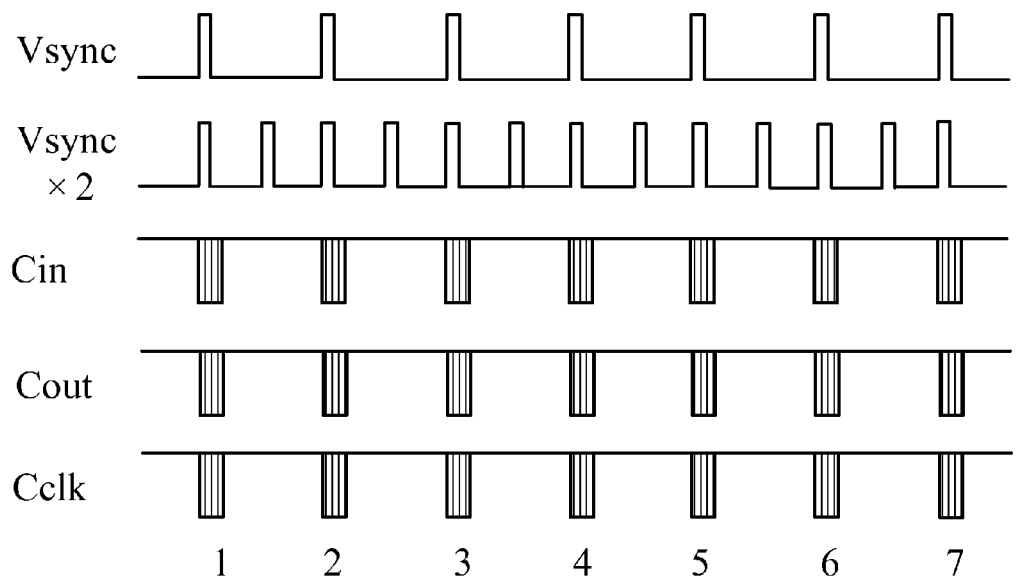
FIG. 4 illustrates a second communication mode in Embodiment 1.

FIGS. 3 and 4 each illustrate waveforms of signals (voltages) communicated between the lens microcomputer 8 and the camera microcomputer 12. FIG. 3 illustrates the waveform of the signals in the random timing communication mode as a first communication mode. The random timing communication mode is used when, for example, the image capturing mode set in the camera body 10 is the still image capturing mode.

As illustrated in FIG. 3, the camera microcomputer 12 sequentially outputs clock signals 1 to 7 through the camera synchronization clock output terminal Cclk and outputs the camera communication signals from the camera output terminal Cout to the lens microcomputer 8 in synchronization with the clock signals 1 to 7. The camera microcomputer 12 receives the lens communication signals from the lens microcomputer 8 through the camera input terminal Cin in synchronization with the clock signals 1 to 7. One of the camera and lens communication signals which corresponds to each clock signal corresponds to information of one bite. FIG. 3 illustrates that information constituted by seven bites is transmitted and received. In the random timing communication mode, output timings of the clock signals 1 to 7 are determined not on a basis of any rule but depending on a state of processes performed by the camera microcomputer 12. In other words, each of the clock signals 1 to 7 is output at random timing.

FIG. 4 illustrates the waveform of signals in the V synchronization communication mode as a second communication mode. The V synchronization communication mode is used when, for example, the image capturing mode set in the camera body 10 is the moving image capturing mode. In moving image capturing, image capturing of each of frames constituting a moving image is performed by the camera body 10 in synchronization with a vertical synchronizing signal Vsync. Then, the communication between the camera microcomputer 12 and the lens microcomputer 8 is also performed in synchronization with the vertical synchronizing signal Vsync (in other words, with a predetermined period). The vertical synchronizing signal Vsync typically has a period of 1/60 second.

As illustrated in FIG. 4, the camera microcomputer 12 outputs the clock signals 1 to 7 from the camera synchronization clock output terminal Cclk in synchronization with the vertical synchronizing signals Vsync. The camera microcomputer 12 further transmits the camera communication signals from the camera output terminal Cout to the lens microcomputer 8 in synchronization with the clock signals 1 to 7. Furthermore, the camera microcomputer 12 receives the lens communication signals from the lens microcomputer through the camera input terminal Cin in synchronization with the clock signals 1 to 7. One of the camera and lens communication signals which corresponds to each clock signal corresponds to information of several tens to several hundreds of bites, unlike one of the camera and lens communication signals illustrated in FIG. 3, which corresponds to the information of one bite.

However, the image capturing of one frame is performed with a period of 1/120 second (Vsync×2) during the moving image capturing in some cases. In such a case, the communication between the camera microcomputer 12 and the lens microcomputer 8 may be performed with the period of 1/120 second.

The camera microcomputer 12 and the lens microcomputer 8 each switch the use communication mode between the random timing communication mode and the V synchronization communication mode, depending on whether the image capturing mode set in the camera body is the still image capturing mode or the moving image capturing mode. Next, description will be made of a switching process of the use communication mode in this embodiment when the image capturing mode is switched from the still image capturing mode to the moving image capturing mode, with reference to FIG. 5.

Figure 5:
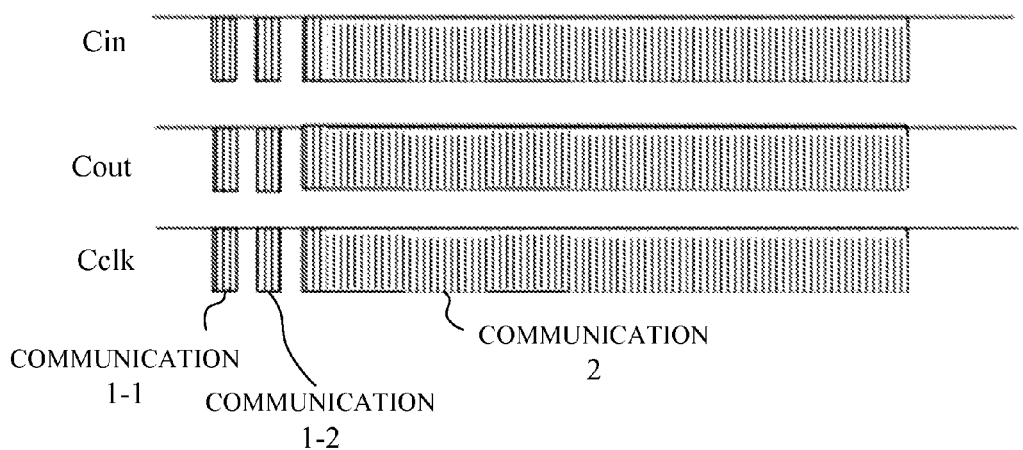
FIG. 5 illustrates a method of switching the communication mode in Embodiment 1.

In FIG. 5, in communication 1-1, the camera microcomputer 12 operating in the random timing communication mode in the still image capturing mode performs a communication for instructing the lens microcomputer 8 to switch its use communication mode to the V synchronization communication mode in response to switching of the image capturing mode to the moving image capturing mode. Specifically, the camera microcomputer 12 transmits, to the lens microcomputer 8, V synchronization communication command information (one bite) for causing the lens microcomputer 8 to set the V synchronization communication mode.

The lens microcomputer 8 having received the V synchronization communication command information produces complement information (second correspondence information) that is information of one's complement of this V synchronization communication command information. The information of one's complement of this command information is easily obtained by replacing the command information with a binary number and inverting 1 and 0 therein. This complement information is different from the V synchronization communication command information and in correspondence with the V synchronization communication command information. Then, the lens microcomputer 8 replies (transmits) this complement information to the camera microcomputer 12.

Meanwhile, the camera microcomputer 12 produces complement information (first correspondence information) that is information of one's complement of the V synchronization communication command information transmitted to the lens microcomputer 8 and transmits in next communication 1-2 this complement information to the lens microcomputer 8. In communication 1-2, the camera microcomputer 12 receives this complement information (first second correspondence information) from the lens microcomputer 8.

The camera microcomputer 12 then calculates a sum of the V synchronization communication command information and the complement information received from the lens microcomputer 8 and determines whether or not the sum is a hexadecimal number FFhex (specific value). Similarly, the lens microcomputer 8 calculates a sum of the V synchronization communication command information and the complement information received from the camera microcomputer 12 and determines whether or not the sum is the hexadecimal number FFhex. This process utilizes a fact that a sum of a value and one's complement of the value is always FFhex and thus allows the camera microcomputer 12 and the lens microcomputer 8 to confirm whether or not the lens microcomputer 8 correctly recognizes the command information instructing the switching of the use communication mode.

If the lens microcomputer 8 wrongly recognizes the command information transmitted from the camera microcomputer 12 and instructing the switching of the use communication mode, the microcomputers 8 and 12 would communicate with each other in communication formats corresponding to different communication modes. As a result, the image capturing system would not be able to perform a correct operation. In particular, in the V synchronization communication mode illustrated in FIG. 4, an information amount to be communicated is several ten or several hundred times higher than that in the random timing communication mode illustrated in FIG. 3, and thus the use communication mode needs to reliably match between the camera microcomputer 12 and the lens microcomputer 8. For this reason, in this embodiment, the camera microcomputer 12 and the lens microcomputer 8 each set, upon a confirmation that the lens microcomputer 8 correctly recognizes the command information instructing the switching of the use communication mode, one communication mode (the random timing or V synchronization communication mode) corresponding to the command information as the use communication mode. In this embodiment, the information of one's complement of the command information is used as information for this confirmation. Furthermore, each of the camera microcomputer 12 and the lens microcomputer 8 transmits the information of one's complement produced by itself to the other and performs the confirmation by calculating the sum of the information of one's complement received from the other and the command information.

In FIG. 5, communication 2 represents a communication after the use communication mode is switched to the V synchronization communication mode in response to a confirmation of correct recognition of the V synchronization communication command information by the lens microcomputer 8.

Figures 6, 7A, 7B:
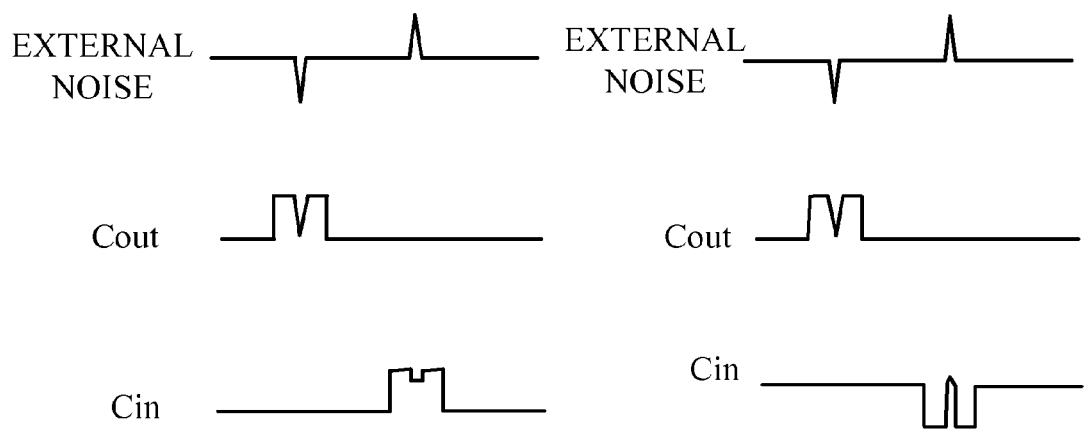
FIG. 6 illustrates an example of command communication in Embodiment 1.
FIGS. 7A and 7B illustrate examples of an external noise in Embodiment 1.

FIG. 6 illustrates examples of the command information instructing the switching of the use communication mode and the information of one's complement of the command information. The information of one's complement of the command information of 89hex, ABhex, CDhex, EFhex and E7hex are respectively 76hex, 54hex, 32hex, 10hex and 18hex. The sum of any command information and the information of one's complement thereof is always FFhex.

When, for example, the camera microcomputer 12 transmits 89hex as the V synchronization communication command information to the lens microcomputer 8, each of the camera microcomputer 12 and the lens microcomputer 8 transmits 76hex to the other. Then, each of the camera microcomputer 12 and the lens microcomputer 8 switches the use communication mode to the V synchronization communication mode in response to reception of 76hex from the other (in response to a confirmation that the sum of 89hex and 76hex is FFhex). On the other hand, when at least one of the camera microcomputer 12 and the lens microcomputer 8 does not receive 76hex, the camera microcomputer 12 and the lens microcomputer 8 each assume generation of a communication error and restrict (that is, do not perform) the switching of the use communication mode to the V synchronization communication mode. This avoids a mismatching between the use communication mode of the camera microcomputer 12 and that of the lens microcomputer 8.

The above describes the case of switching the use communication mode on a basis of the determination that the sum of the command information and the information of one's complement thereof is FFhex, but the switching may be performed only on a basis of a determination that the information of one's complement of the command information is correctly received.

FIGS. 7A and 7B each illustrate waveforms of communication signals that are transmitted and received between the camera microcomputer 12 and the lens microcomputer 8 and on which an external noise is superimposed.

The external noise includes various noises such as an inductive or emissive noise received from a power source or an electromagnetic wave generator and a surge noise caused by static electricity. The inductive or emissive noise is periodically generated, and the surge noise is sporadically generated. As illustrated in FIGS. 7A and 7B, the inductive or emissive noise is typically superimposed on the communication signal to continuously apply a positive voltage and a negative voltage to the communication signal, causing continuous positive and negative variations of the communication signal. When the noise is sporadically generated, communicating the same command information multiple times can achieve correct communication of the command information. However, when the noise causing the continuous positive and negative variations of the signs of the communication signal is generated, synchronization of a generation period of the noise and a communication period of the communication signal makes it impossible to communicate correct command information even if the same command information is communicated multiple times.

Since the image capturing system in this embodiment employs a communication system in which the camera microcomputer 12 transmits the command information to the lens microcomputer 8, the camera microcomputer 12 should determine whether or not the communication of the command information is affected by noise. In other words, since the camera microcomputer 12 performs a recovery operation of the communication when the lens microcomputer 8 does not correctly response to the command information from the camera microcomputer 12, the communication system is desirably configured to avoid a false operation of the camera microcomputer 12.

FIG. 7A illustrates a case in which the camera microcomputer 12 (Cout) transmits the command information to the lens microcomputer 8 and the lens microcomputer 8 replies the same information as the command information to the camera microcomputer 12 (Cin). On the other hand, FIG. 7B illustrates a case in which the camera microcomputer 12 (Cout) transmits the command information to the lens microcomputer 8 and the lens microcomputer 8 replies the information of one's complement (second correspondence information) for the command information to the camera microcomputer (Cin). In both cases in FIGS. 7A and 7B, the external noise is superimposed on the command information from the camera microcomputer 12 and information replied from the lens microcomputer 8 (hereinafter referred to as "reply information"). The following description is assumed that two kinds of hexagonal numbers, namely "EFhex" corresponding to the first communication mode and "E7hex" corresponding to the second communication mode, are provided as the command information that is transmitted from the camera microcomputer 12 to the lens microcomputer 8 and that instructs the switching (setting) of the use communication mode.

FIG. 7A illustrates a case in which, during a transmission of the command information "EFhex" (11101111) corresponding to the first communication mode from the camera microcomputer 12 to the lens microcomputer 8, an external noise that adds a negative voltage to the command information is superimposed on the command information and as a result the lens microcomputer 8 receives the command information "E7hex" (11100111) instead of "EFhex". The command information "E7hex" corresponds to the second communication mode, and therefore the lens microcomputer 8 having received this information replies "E7hex" as reply information that is the same information as the received command information to the camera microcomputer 12. When the external noise in this case is the above-mentioned sporadic noise, the camera microcomputer 12 can determine on a basis of reception of "E7hex" from the lens microcomputer 8 that the command information is not correctly transmitted to the lens microcomputer 8, and thus there would be no problem.

However, when a positive voltage due to a periodic external noise is superimposed on the reply information "E7hex" from the lens microcomputer 8 to the camera microcomputer 12 (Cin) as illustrated in FIG. 7A, the positive noise voltage is applied to, for example, a low level signal of he reply information "E7hex". In this case, the camera microcomputer 12 receives "EFhex" as the reply information from the lens microcomputer 8. This causes the camera microcomputer 12 to wrongly determine that the command information is correctly transmitted to the lens microcomputer 8 and thus switches its use communication mode to the V synchronization communication mode, whereas the lens microcomputer 8 maintains the random timing communication mode as its use communication mode. As a result, the use communication modes set by the camera microcomputer 12 and the lens microcomputer 8 are mutually different, and therefore the communication therebetween cannot be performed correctly and the image capturing system cannot function correctly.

On the other hand, FIG. 7B also illustrates the case in which the external noise that adds the negative voltage to the command information is superimposed during the transmission of the command information "EFhex" from the camera microcomputer 12 to the lens microcomputer 8 and accordingly the lens microcomputer 8 receives the command information as "E7hex". However, in the case of FIG. 7B, "18hex" (00011000), which is the information of one's complement of "E7hex" is transmitted as the reply information from the lens microcomputer 8 to the camera microcomputer 12 (Cin). In this case, since superimposition of the positive voltage due to the periodic external noise on the complement information "18hex" only adds the positive voltage due to this external noise to a high level signal of "18hex", the complement information is received as "18hex" by the camera microcomputer 12. This causes the camera microcomputer 12 to determine that the command information is not correctly transmitted to the lens microcomputer 8 and thereby does not perform the switching of the use communication mode. In other words, this can avoid a false determination by the camera microcomputer 12 that the command information is correctly transmitted to the lens microcomputer 8.

It is inconvenient that the switching of the use communication mode is disabled because of the external noise through this restriction on the switching of the use communication mode. Thus, it is desirable in this case to restart a correct communication between the microcomputers 8 and 12 by causing the camera microcomputer 12 having determined that the command information is not correctly transmitted to the lens microcomputer 8 to perform a recovery operation of the communication with the lens microcomputer 8. In the case of FIG. 7A, the false determination by the camera microcomputer 12 makes it difficult to restart the correct communication between the camera microcomputer 12 and the lens microcomputer 8. In contrast, in the case of FIG. 7B, since the camera microcomputer 12 does not perform such a false determination, the correct communication can be easily restarted between the camera microcomputer 12 and the lens microcomputer 8. In this manner, causing the lens microcomputer 8 to reply the information of one's complement (second correspondence information) for the received command information to the camera microcomputer 12 is advantageous than causing the lens microcomputer 8 to reply the same information as the command information. Similarly, causing the camera microcomputer 12 to transmit the information of one's complement (first correspondence information) for the command information to the lens microcomputer 8 and to perform the same determination as that for the camera microcomputer 12 can avoid the false determination by the lens microcomputer 8.

As described above, using information of one's complement of the command information to check whether the command information instructing the switching of the use communication mode is correctly communicated allows the image capturing system to be robust to influence of the external noise.

Figure 8:
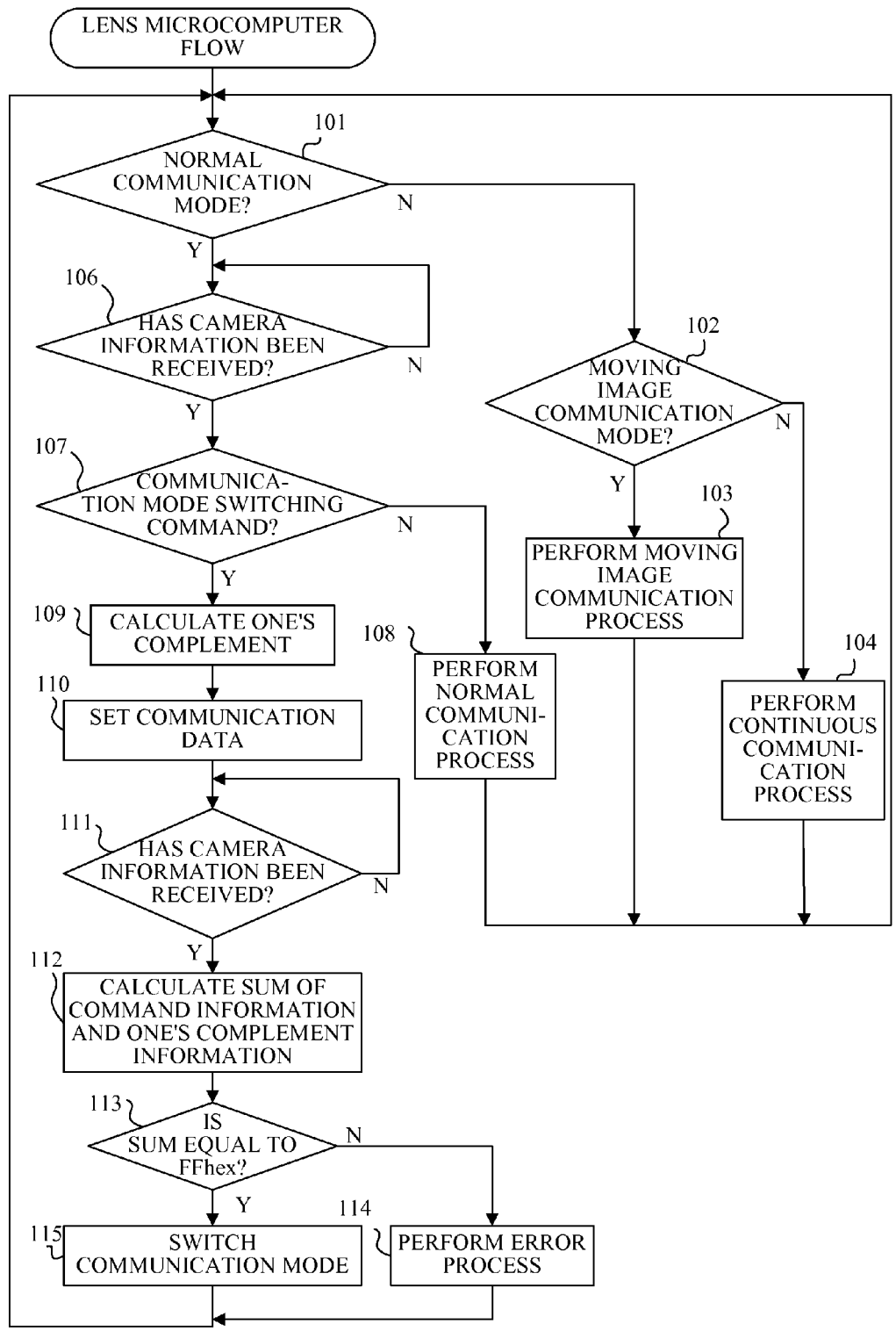
FIG. 8 is a flowchart showing a process performed by the lens microcomputer in Embodiment 1.

FIG. 8 is a flowchart of a communication control process (communication control method) performed by the lens microcomputer 8. Description will be mainly made of a lens side switching process of the use communication mode when the image capturing mode of the camera body 10 is switched from the still image capturing mode to the moving image capturing mode. The lens microcomputer 8 as a computer executes this process according to a lens communication control program as a computer program.

At step 101, the lens microcomputer 8 determines whether or not its currently set mode among selectable multiple communication modes, in other words, its use communication mode used in the communication with the camera microcomputer 12 is the random timing communication mode used in the still image capturing mode. In FIG. 8, the random timing communication mode is referred to as "a normal communication mode". In the following, description will be made of a case in which the multiple communication modes include, in addition to the random timing communication mode and the V synchronization communication mode used in the moving image capturing mode, a continuous communication mode merely used to communicate information.

The continuous communication mode is, for example, a communication mode in which the lens microcomputer 8 continuously transmits information of approximately 10,000 bites to the camera microcomputer in response to communication of an instruction command from the camera microcomputer 12 in the random communication described using FIG. 3. Once communication starts in the continuous communication mode, no other communication can be performed until the transmission of the information of approximately 10,000 bites is completed. Thus, the communication of the command information from the camera microcomputer 12 needs to be robust to the influence of the external noise. For this reason, the same configuration as in the case of switching the random timing communication mode to the V synchronization communication mode needs to be set also in a case of switching the random timing communication mode to the continuous communication mode.

If the current use communication mode is the random timing communication mode at step 101, the lens microcomputer 8 proceeds to step 106. Otherwise, the lens microcomputer 8 proceeds to step 102.

At step 102, the lens microcomputer 8 determines whether or not its current use communication mode is the V synchronization communication mode (referred to as "a moving image communication mode" in FIG. 8). If the current use communication mode is the V synchronization communication mode, the lens microcomputer 8 proceeds to step 103. If the current use communication mode is not the V synchronization communication mode, the lens microcomputer 8 determines that the current use communication mode is the continuous communication mode and proceeds to step 104.

At step 103, the lens microcomputer 8 performs a process for communicating with the camera microcomputer 12 in a communication format corresponding to the V synchronization communication mode and returns to step 101 when this process is completed.

At step 104, the lens microcomputer 8 performs a process for communicating with the camera microcomputer 12 in a communication format corresponding to the continuous communication mode and returns to step 101 when this process is completed.

At step 106, the lens microcomputer 8 waits reception of the command information from the camera microcomputer 12. In response to the reception of the command information, the lens microcomputer 8 proceeds to step 107.

At step 107, the lens microcomputer 8 analyzes the command information received from the camera microcomputer 12, that is, determines whether or not the command information instructs a switching of the use communication mode (to the V synchronization communication mode or the continuous communication mode). If the command information instructs the switching of the use communication mode, the lens microcomputer 8 proceeds to step 109. If not, the lens microcomputer 8 proceeds to step 108 to maintain the random timing communication mode as its use communication mode and then returns to step 101.

At step 109, the lens microcomputer 8 calculates information of one's complement (complement information) for the received command information. The complement information may not be calculated directly from the command information, and instead may be previously stored for the command information in a separate memory and read out the complement information corresponding to the received command information.

Next at step 110, the lens microcomputer 8 transfers the complement information calculated at step 109 to an internal register as a transmission buffer of its communication function. Then, the lens microcomputer 8 performs a process for transmitting the complement information (second correspondence information) to the camera microcomputer 12 in a next communication therewith.

Next at step 111, the lens microcomputer 8 waits reception of the complement information (first correspondence information) from the camera microcomputer 12. Then, in response to the reception of the complement information from the camera microcomputer 12, the lens microcomputer 8 calculates at step 112 a sum of the received complement information and the command information received at step 106 (and step 107).

Then, at step 113, the lens microcomputer 8 determines whether or not the sum calculated at step 112 is equal to the specific value "FFhex" (hexadecimal number). If the sum is not equal to "FFhex", the lens microcomputer 8 determines that correct command information has not been received from the camera microcomputer 12 (that is, the external noise is superimposed on the correct command information) and proceeds to step 114. On the other hand, if the sum is equal to "FFhex", the lens microcomputer 8 determines that the correct command information has been received from the camera microcomputer 12 and proceeds to step 115.

At step 114, the lens microcomputer 8 executes an error process for notifying the camera microcomputer of a communication error, initializes its communication function and then returns to step 101.

At step 115, the lens microcomputer 8 sets its use communication mode to one of the multiple communication modes which corresponds to the command information received at step 106. This completes the switching process of the use communication mode. Thereafter, the lens microcomputer 8 returns to step 101.

Figure 9:
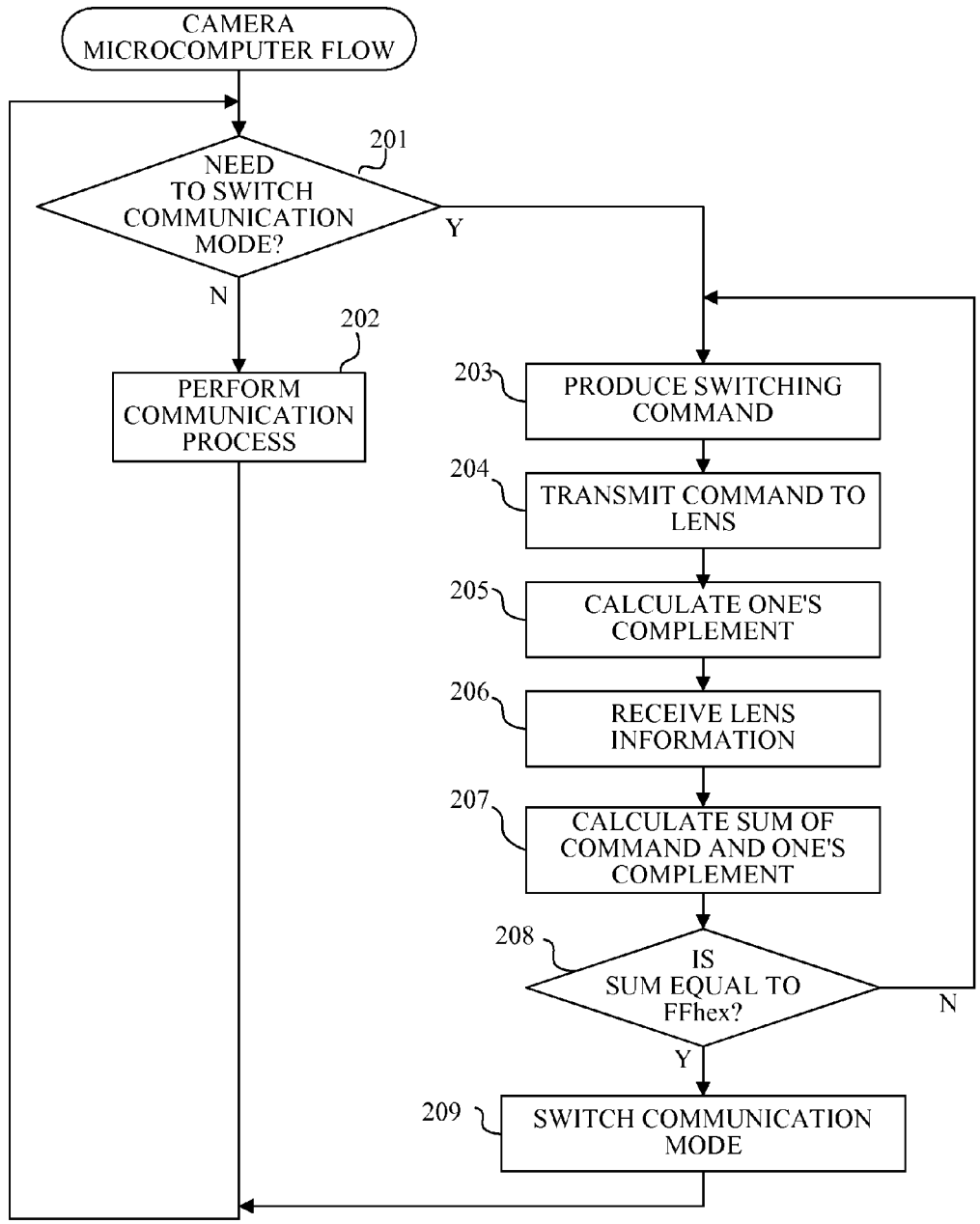
FIG. 9 is a flowchart showing a process performed by the camera microcomputer in Embodiment 1.

FIG. 9 is a flowchart of a communication control process (communication control method) performed by the camera microcomputer 12. In the following, description will be mainly made of a camera side switching process of the use communication mode when the image capturing mode of the camera body 10 is switched from the still image capturing mode to the moving image capturing mode. The camera microcomputer 12 as a computer executes this processing according to the camera communication control program as a computer program.

At step 201, the camera microcomputer 12 determines whether a current image capturing mode is the still image capturing mode or the moving image capturing mode and further determines whether or not the use communication mode currently set for communication with the lens microcomputer 8 corresponds to the current image capturing mode. If the use communication mode corresponds to the current image capturing mode, the use communication mode does not need to be switched. Thus, the camera microcomputer 12 performs a process for communicating with the lens microcomputer 8 in a communication format corresponding to the current use communication mode at step 202 and then returns to step 201. On the other hand, if the use communication mode does not correspond to the current image capturing mode, the camera microcomputer 12 proceeds to step 203.

At step 203, the camera microcomputer 12 produces command information that instructs the lens microcomputer 8 a switching of the use communication mode to one of the multiple communication modes which corresponds to the current image capturing mode. Then, at step 204, the camera microcomputer 12 transmits the command information to the lens microcomputer 8.

Next at step 205, the camera microcomputer 12 calculates information of one's complement (complement information) for the command information transmitted to the lens microcomputer 8. The complement information may not be calculated directly from the command information, and instead may be previously stored for the command information in a separate memory and read out the complement information corresponding to the received command information from the memory.

Next at step 206, the camera microcomputer 12 transfers the complement information calculated at step 205 to an internal register as a transmission buffer of its communication function. Then, the camera microcomputer 12 performs a process for transmitting the complement information (first correspondence information) to the lens microcomputer 8 in a next communication therewith. In this step, the camera microcomputer 12 receives the complement information (second correspondence information) calculated by the lens microcomputer 8 therefrom.

Next at step 207, the camera microcomputer 12 calculates a sum of the complement information received from the lens microcomputer 8 at step 206 and the command information produced at step 203 and transmitted to the lens microcomputer 8 at step 204.

Then, at step 208, the camera microcomputer 12 determines whether the sum calculated at step 207 is equal to the specific value "FFhex". When the sum is not equal to "FFhex", the camera microcomputer 12 determines that the lens microcomputer 8 has not received correct command information (that is, the external noise is superimposed on the correct command information) and proceeds to step 203 in order to again transmit the command information to the lens microcomputer 8. Simultaneously, the camera microcomputer 12 performs a process for the error notification from the lens microcomputer 8. On the other hand, when the sum is equal to "FFhex", the camera microcomputer 12 determines that the lens microcomputer 8 has received the correct command information and proceeds to step 209.

At step 209, the camera microcomputer 12 sets its use communication mode to one of the multiple communication modes which corresponds to the command information produced at step 203. This completes the switching processing of the use communication mode. Thereafter, the camera microcomputer 12 returns to step 201.

As described above, in this embodiment, the use communication mode for the communication between the interchangeable lens 1 and the camera body 10 is switched on a basis of the command information and the complement information in correspondence therewith, thereby achieving robustness of the image capturing system to the influence of the external noise when the use communication mode is switched.

Embodiment 2

Embodiment 1 describes the case in which the information of one's complement of the command information is used as correspondence information in correspondence with the command information. The information of one's complement is used because it can be calculated simply through bit inversion of a binary number replacing the command information.

However, information other than the information of one's complement may be used as the correspondence information to achieve the robustness to the influence of the external noise. In other words, the description with reference to FIGS. 7A and 7B in Embodiment 1 suggests that the correspondence information may be at least different from the command information. Specifically, the information different from the command information may be a predetermined value, such as 0, 1, 2, . . . , which is in correspondence with the command information. However, the correspondence information desirably does not require heavy calculation by the microcomputer.

Although each of the embodiments described the case of using the interchangeable lens as the image capturing accessory, image capturing accessories as alternative embodiments of the present invention include a flash (strobe) apparatus and others which are not the interchangeable lens.

Furthermore, although each of the embodiments described the switching of the use communication mode between the random timing communication mode and the V synchronization communication mode, alternative embodiments of the present invention may switch the use communication mode between other communication modes. For example, an alternative embodiment may switch the use communication mode between a communication mode of having a communication waiting state (busy state) after communication in a predetermined amount (for example, one bite) of data in synchronization with a clock signal and a communication mode of continuously communicating multiple data without having the communication waiting state.

In each of the embodiments, the use communication mode for the communication between the interchangeable lens as an accessory and the camera as the image capturing apparatus is set (switched) on the basis of the command information and information in correspondence therewith, thereby achieving the robustness to the influence of the external noise in the switching of the use communication mode.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-219941, filed on Oct. 29, 2014, which is hereby incorporated by reference herein in its entirety.

What is claimed is:

1. An accessory detachably attachable to an image capturing apparatus, the accessory comprising:
   a communicator configured to communicate with the image capturing apparatus in multiple communication modes; and
   a communication mode setter configured to set one of the multiple communication modes which corresponds to command information received from the image capturing apparatus as a use communication mode used to communicate with the image capturing apparatus,
   wherein the communication mode setter is configured to:
   set the use communication mode corresponding to the command information in response to reception of the command information and reception of first correspondence information different from the command information and in correspondence with the command information, from the image capturing apparatus, and
   transmit, to the image capturing apparatus, second correspondence information different from the command information and in correspondence with the command information in response to the reception of the command information from the image capturing apparatus.

2. The accessory according to claim 1, wherein the first correspondence information is information of one's complement of the command information.

3. The accessory according to claim 2,
   wherein the communication mode setter is configured to:
   determine whether or not a sum of the command information and the first correspondence information as the information of one's complement is equal to a specific value; and
   set the use communication mode corresponding to the command information in a case where the sum is equal to the specific value.

4. The accessory according to claim 1, wherein the first correspondence information is information on a predetermined value in correspondence with the command information.

5. The accessory according to claim 1, wherein the communication modes include a communication mode of performing communication between the accessory and the image capturing apparatus at random timing and a communication mode of performing communication with a predetermined period therebetween.

6. The accessory according to claim 1, wherein the communication modes include a communication mode of continuously performing multiple data communications between the accessory and the image capturing apparatus and a communication mode of individually performing data communication therebetween.

7. The accessory according to claim 1, wherein the first correspondence information and the second correspondence information each represent the same predetermined value.

8. The accessory according to claim 2,
   wherein the communication mode setter is configured to:
   determine whether or not a sum of the command information and the first correspondence information as the information of one's complement is equal to a specific value; and
   transmit, to the image capturing apparatus, the second correspondence information in a case where the sum is equal to the specific value.

9. An image capturing apparatus to which an accessory is detachably attachable, the image capturing apparatus comprising:
   a communicator configured to communicate with the accessory in multiple communication modes; and
   a communication mode setter configured to select one of the multiple communication modes to set the selected communication mode as a use communication mode used to communicate with the accessory,
   wherein the communication mode setter is configured to:
   transmit command information for causing the accessory to set the selected communication mode as the use communication mode to the accessory and first correspondence information different from the command information and in correspondence with the command information; and
   set the selected communication mode as the use communication mode in response to reception of second correspondence information different from the command information and in correspondence with the command information from the accessory, the second correspondence information being received after transmitting, by the communication mode setter, the command information.

10. The image capturing apparatus according to claim 9, wherein the second correspondence information is information of one's complement of the command information.

11. The image capturing apparatus according to claim 10, wherein the communication mode setter is configured to:
   determine whether or not a sum of the command information and the second correspondence information as the information of one's complement is equal to a specific value; and
   set the selected communication mode as the use communication mode in a case where the sum is equal to the specific value.

12. The image capturing apparatus according to claim 9, wherein the second correspondence information is information on a predetermined value in correspondence with the command information.

13. The image capturing apparatus according to claim 9, wherein the communication modes include a communication mode of performing communication between the image capturing apparatus and the accessory at random timing and a communication mode of performing communication with a predetermined period therebetween.

14. The image capturing apparatus according to claim 9, wherein the communication modes include a communication mode of continuously performing multiple data communications between the image capturing apparatus and the accessory and a communication mode of individually performing data communication therebetween.

15. A method of controlling an accessory detachably attachable to an image capturing apparatus,
   the accessory being configured to communicate with the image capturing apparatus in multiple communication modes and to set one of the multiple communication modes which corresponds to command information received from the image capturing apparatus as a use communication mode used to communicate with the image capturing apparatus,
   the method comprising the steps of:
   receiving the command information from the image capturing apparatus and first correspondence information different from the command information and in correspondence with the command information from the image capturing apparatus;
   setting the use communication mode corresponding to the command information in response to reception of the command information and reception of the first correspondence information; and
   transmitting, to the image capturing apparatus, second correspondence information different from the command information and in correspondence with the command information in response to the reception of the command information from the image capturing apparatus.

16. A non-transitory computer-readable storage medium storing a communication control program as a computer program for controlling an accessory detachably attachable to an image capturing apparatus,
   the accessory being configured to communicate with the image capturing apparatus in multiple communication modes and to set one of the multiple communication modes which corresponds to command information received from the image capturing apparatus as a use communication mode used to communicate with the image capturing apparatus,
   the program causes a computer included in the accessory to execute a process comprising the steps of:
   receiving the command information from the image capturing apparatus and first correspondence information different from the command information and in correspondence with the command information from the image capturing apparatus;
   setting the use communication mode corresponding to the command information in response to reception of the command information and reception of the first correspondence information; and
   transmitting, to the image capturing apparatus, second correspondence information different from the command information and in correspondence with the command information in response to the reception of the command information from the image capturing apparatus.

17. A method of controlling an image capturing apparatus to which an accessory is detachably attachable,
   the image capturing apparatus being configured to communicate with the accessory in multiple communication modes and to select one of the multiple communication modes to set the selected communication mode as a use communication mode used to communicate with the accessory,
   the method comprising the steps of:
   transmitting command information for causing the accessory to set the selected communication mode as the use communication mode to the accessory and first correspondence information different from the command information and in correspondence with the command information from the image capturing apparatus;
   receiving second correspondence information different from the command information and in correspondence with the command information from the accessory, the second correspondence information being received after transmitting the command information; and
   setting the selected communication mode as the use communication mode in response to reception of the second correspondence information.

18. A non-transitory computer-readable storage medium storing a communication control program as a computer program for controlling an image capturing apparatus to which an accessory is detachably attachable,
   the image capturing apparatus being configured to communicate with the accessory in multiple communication modes and to select one of the multiple communication modes to set the selected communication mode as a use communication mode used to communicate with the accessory,
   the program causes a computer included in the image capturing apparatus to execute a process comprising the steps of:
   transmitting command information for causing the accessory to set the selected communication mode as the use communication mode to the accessory and first correspondence information different from the command information and in correspondence with the command information from the image capturing apparatus;
   receiving second correspondence information different from the command information and in correspondence with the command information from the accessory, the second correspondence information being received after transmitting the command information; and
   setting the selected communication mode as the use communication mode in response to reception of the second correspondence information.

19. The accessory according to claim 9, wherein the first correspondence information and the second correspondence information each represent the same predetermined value.

20. The accessory according to claim 10, the communication mode setter is configured to:

determine whether or not a sum of the command information and the second correspondence information as the information of one's complement is equal to a specific value; and set the selected communication mode as the use communication mode set in a case where the sum is equal to the specific value.

\* \* \* \* \*